July 7, 1953 W. McK. WHITE, JR 2,644,657
SWITCH HEATER CONTROLLER
Filed Dec. 31, 1947 2 Sheets-Sheet 1
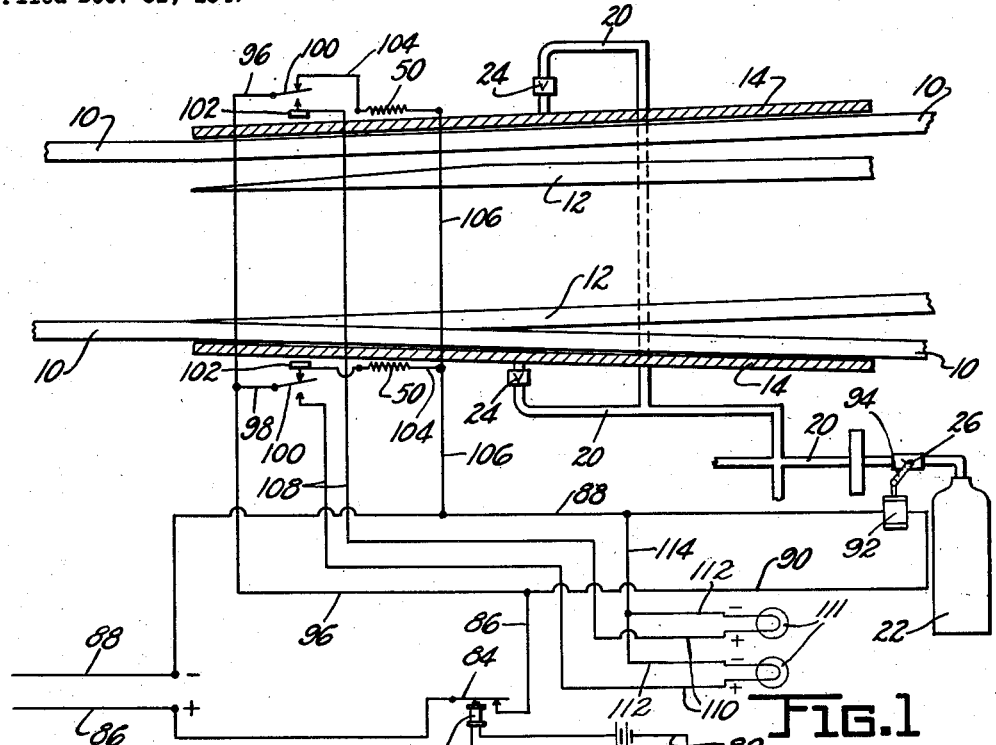
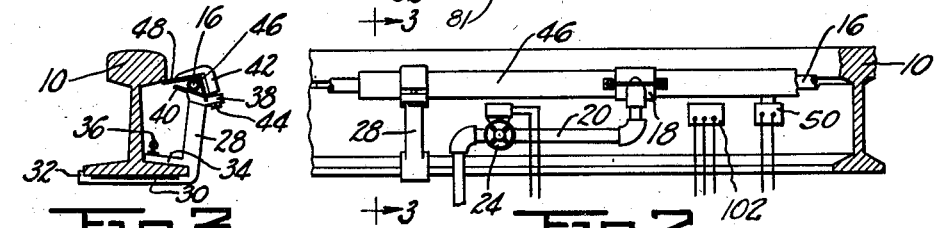
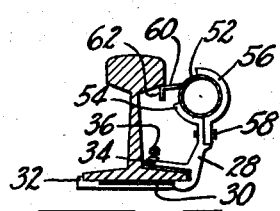
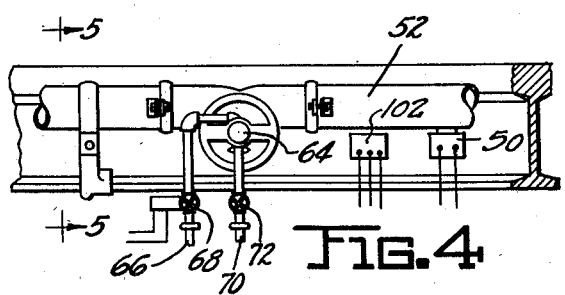
INVENTOR
WILLIAM McKEAN WHITE, JR.
BY
Altsch & Knoblock
ATTORNEYS July 7, 1953

W. McK. WHITE, JR 2,644,657

SWITCH HEATER CONTROLLER

Filed Dec. 31, 1947

INVENTOR
WILLIAM McKEAN WHITE, JR.
BY
Altach & Knoblock
ATTORNEYS

Patented July 7, 1953

2,644,657

UNITED STATES PATENT OFFICE 2,644,657

SWITCH HEATER CONTROLLER

William McKean White, Jr., Elkhart, Ind., assignor to White Manufacturing Company, Elkhart, Ind., a corporation of Indiana Application December 31, 1947, Serial No. 794,979

4 Claims. (Cl. 246—428)

This invention relates to improvements in switch heater controllers, and particularly to controllers by means of which the heaters for railroad rail switches may be operated from a remotely located control station.

The primary object of the invention is to provide means operable at a control station by a train dispatcher, signalman, or other person responsible for the routing and travel of trains on a given portion of a railroad, for the purpose of actuating a rail switch heater for a rail switch which has been frozen or rendered inoperable for a change in setting thereof in cold weather.

A further object is to provide a simple control system by means of which the sequence of operations necessary to be performed for the successful functioning of a rail switch heater may be controlled at a remotely located control station by a single controller and the functioning of the heater can be indicated and verified at the control station.

A further object is to provide an electric rail switch heater controller having a control circuit actuable by means located at a remote control station and adapted to control the supply of fuel to the heater, the ignition of the fuel in said heater and signals for indicating at the control station the operating condition of the heater.

A further object is to provide a switch heater controller having an electrical circuit actuable from a remote location by means of a relay and which includes fuel control means, fuel ignition means, means for deenergizing said ignition means after the heater is ignited, and indicating means correlated with said ignition deenergizing means for designating at the control station the operative condition of the heater.

Other objects will be apparent from the following specification.

In the drawings:

Fig. 1 is a wiring diagram of the control circuit illustrating the switch heater diagrammatically.

Fig. 2 is a fragmentary side elevational view of a switch heater utilizing combustible gas in its operation.

Fig. 3 is a vertical sectional view taken on line 3—3 of Fig. 2.

Fig. 4 is a fragmentary view in side elevation of a switch heater utilizing oil as the fuel for the heater.

Fig. 5 is a sectional view taken on line 5—5 of Fig. 4.

Figure 6:
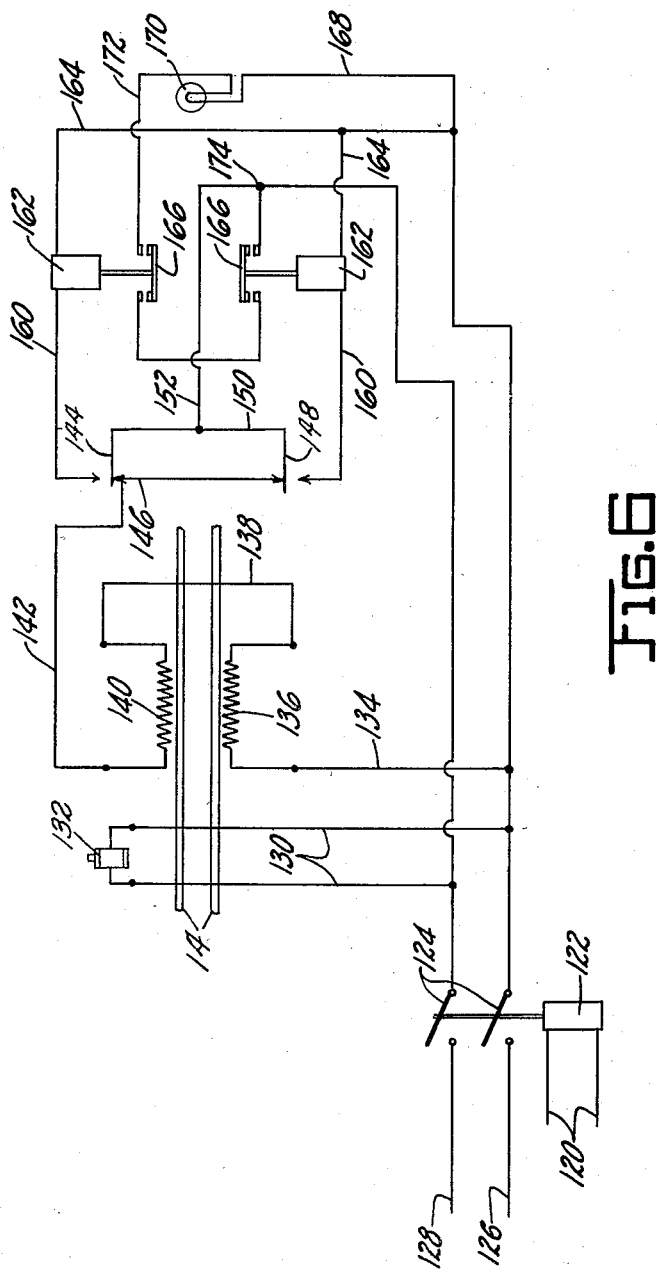
Fig. 6 is a wiring diagram illustrating a circuit constituting a modified embodiment of the invention.

It is becoming common practice in the operation of railroads to control the movement of trains on a given section or portion of a line from a single control station. This has the advantage of providing a unified control of train movements and entails the operation of switches to effect the desired movement of trains by remote control means. The system of remote control is feasible and effective as long as the remote control switch operating means are effective and operative. However, in many areas which are subject to adverse weather conditions, such as heavy snowfall and ice formation during cold weather, the rail switches may become frozen or stuck to resist operation thereof as required for a given setting. It is common practice, therefore, to provide rail switches in such locations with switch heaters which can be operated to thaw out the rail switch and free it for required setting and adjustment. With a remote control system of operating the switches, the failure of any given switch to operate necessitates stopping of train traffic to avoid misrouting of trains, and this stoppage of traffic may be of long duration in the case of remotely located switches, determined by the length of time required for a maintenance operator to travel to the point at which the switch is frozen, for the purpose of operating the switch heater. The loss of time involved in such cases and the expense of rectifying the condition will be losses to the railroad which can assume large and serious proportions during the course of a winter operating season. My improved controller is designed for use in conjunction with the remotely controlled switch operating means to enable the train dispatcher, or other individual at said station who is responsible for the routing of trains, to control the operation of the switch heater in addition to the operation of the switch adjusting means.

In the drawings the numeral 10 designates the outer rails at a switch in conjunction with which are provided switch rails 12 adapted for adjustment in either of two operating conditions, one of which has been illustrated in Fig. 1 as constituting engagement of the lower switch rail with the lower main rail to provide for travel of the train along a line extending upwardly and to the right over the upper rail 10 and the lower switch rail 12. The other operative position of the switch entails the engagement of the upper switch rail 12 with the upper rail 10 and the spaced relation of the lower switch rail 12 from the lower rail 10. Any suitable means (not shown), including electrical mechanism operated under control of an operator at a remote control station, may be utilized for shifting the two switch rails 12 to their selected operating position.

The use of rail switch heaters is common in areas where the switches are subject to freezing in cold winter weather, and such rail heaters may be of any desired type. Two types of rail switch heaters commonly utilized have been illustrated herein, that shown in Figs. 2 and 3 being a gas operated heater, and that shown in Figs. 4 and 5 being an oil operated heater. The heaters are designated generally herein by the numeral 14 and are usually positioned at the outer side of the outer rails 10 at the switch, in case of a single switch. It will be understood, however, that where a multiple rail switch is involved, a larger number of switch heaters must be employed, and these switch heaters will be located alongside stationary rails forming a part of the switch, as distinguished from the movable parts or rails of the switch.

The gas operated form of heater illustrated in Figs. 2 and 3 entails the use of a gas conduit 16 having burner apertures (not shown) positioned in spaced relation along its length facing toward the rail 10. This conduit is connected by a fitting 18 with a supply conduit 20 leading to a tank 22 or other source of gas supply. Domestic gas, either manufactured or natural, may be utilized in cases where the switches are located in urban communities having such gas available. In remote locations bottle gas, such as propane, or compressed liquid gas stored in containers 22, may be utilized. The conduits 20 leading to the burner tube 16 may be provided with individual control valves 24, and the system may also include a master valve 26 for controlling the supply of gas to all of the switch heaters supplied from a given common source of supply 22, that is, control the source of supply to all heaters in a network. The opposite ends of the burner tube are capped or sealed so that the only outlet for gas from the tube is through the burner apertures therein.

The burner conduit or tube 16 is preferably mounted at an elevation substantially as shown in Figs. 2 and 3 below the level of the upper surface of the head of the rail, for example, at approximately the level of the junction between the head and the web of the rail. A plurality of upright bracket arms 28, of which only one has been illustrated in Fig. 2, are each provided at their ends with a jaw 30 passing under the base of the rails 10 and having a terminal hook portion 32 engaging the side edge of the rail base at the side of the rail opposite that at which the bracket 28 is positioned. A second jaw 34 on each bracket engages the upper surface of the rail base and a securing member 36 threaded in the jaw 34 bears against the upper surface of the rail base to fixedly position the parts in locking engagement. The upper end of the bracket 28 mounts a head 38 whose inner portion provides a supporting surface for a plate 40 which underlies the burner conduit tube 16 and projects inwardly therefrom in an upwardly inwardly inclined position, as best shown in Fig. 3. The outer portion of the bracket head 38 supports an angle clamp member 42 having one end thereof secured to the head by the securing member 44 and having its opposite end portion projecting inwardly in downwardly inclined relation and serving to clamp an angle member 46 in position to cooperate with the plate 40 to grip the burner conduit 16 and hold it in an operative position. The angle member 46 is preferably coextensive in length with the burner conduit 16 as is the plate 40 also, and the angle member 46 includes a downwardly inwardly inclined flange portion 48 whose inner margin preferably engages and bears against the bottom surface of the head of the rail 10, as seen in Fig. 3. The inner edge of the plate 40 terminates adjacent to but slightly spaced from the flange 48 and provides a passage through which burning gases are directed against the rail. The arrangement insures a shielding of the burner tube against air currents which might tend to extinguish the combustion and also insures against loss or waste of the heat generated by the heater by insuring the direct application of the heat generated against the rail parts to be heated. Consequently, when the heater operates, the rails 10 at the switches are heated and this heat is conducted by the rails to the switch rails 12 and surrounding operating parts to effectively thaw the switch and permit its operation in a very short time after it has been ignited. Any suitable ignition means, illustrated diagrammatically in Fig. 1 at 50, may be provided for the purpose of igniting the gas. In the present instance this igniting means constitutes an electrical ignition element.

The oil burning switch heater illustrated in Figs. 4 and 5 comprises a conduit 52 sealed at its opposite ends and positioned alongside the outer rails 10 at a switch in substantially the same location as the gas conduit in the embodiment shown in Figs. 2 and 3. The oil conduit 52 is of a sufficient diameter so that it may form a manifold in which the oil may be vaporized and is provided with a series of apertures facing the rail 10 spaced along its length. The conduit 52 is mounted upon a bracket 28 clamped to the base of a rail by the jaws 30 and 34 and the securing means 36 in the same manner described above. The clamp mounted at the upper end of the bracket 28 for gripping the conduit 52 is of slightly different form than in the case of the gas burner and has been illustrated here as comprising a comparatively short inner arcuate jaw 54 formed integrally with the bracket 28 and a comparatively long arcuate jaw 56 mounted upon the bracket 28 by means of the securing members 58. The clamping jaws 54 and 56 are drawn tight around the conduit 52 and position said conduit 52 effectively without interfering with the burner apertures in said tube 52. An elongated angle iron member 60 is preferably welded or otherwise secured to the conduit 52 above the level of the combustion apertures therein and projects inwardly to underlie and preferably engage the bottom of the rail head. The angle iron member preferably extends for the full length of the conduit 52 and terminates in a downturned flange portion 62 confronting the burner apertures.

The conduit 52 is connected intermediate its ends with a mixing valve 64 to which an oil supply conduit 66 provided with a valve 68 is connected. An air supply line 70 provided with a valve 72 is also connected to the valve 64. The conduits 66 and 70 lead to a source of supply of oil and a source of supply of compressed air for the purpose of atomizing the fuel, respectively. Ignition means, such as the ignition element 50 shown in Fig. 1, is suitably positioned to ignite the vaporized fuel to initiate operation of the heater.

While the heaters illustrated in Figs. 2 to 5, inclusive, are types commonly used by railroads, it will be understood that they are referred to herein as illustrative of the forms which a rail switch heater may take, and this invention may be used effectively with these types and may also be used with switch heaters of other types.

One embodiment of my invention for controlling a switch heater is illustrated in Fig. 1 as applied to a single switch with the elongated switch heater parts designated 14 located alongside the outer rail members 10 of the switch, and wherein a single source of supply for the fuel used in the heater is provided in the form of a container 22, and the supply of fuel from the container 22 to the switch heaters 14 through the conduits 20 is controlled by a master control valve 26. A control line circuit, including the leads 80, is connected in a remote control circuit of any desired type and construction and has a control switch 81 located at a control station. This circuit has interposed therein a relay 82 including a switch element 84 interposed in a power supply line 86. The relay 82 is preferably of the type which holds the switch 84 open when the relay is deenergized and which closes said switch when the relay is energized. The power supply circuit, including the line 86 and its companion line 88, may carry either alternating or direct current and may be of any suitable voltage and amperage required for the operation of the switch heater. The circuit 80 may also be either a direct current or an alternating current circuit and may operate at a different voltage than the circuit supplied by the lines 86, 88. The line 86 has a lead 90 branching therefrom in which is interposed the electrical element 92 of a member 94 for actuating the master control valve 26. The line 88 is connected with said element 92 as shown. Consequently, upon actuation of the circuit 80 and the relay 82 therein for the purpose of closing the switch 84, a circuit is established from the line 86 through switch 84, branch line 90, valve operator 92, 94, back to the other side 88 of the power supply line. This circuit serves to open the master control valve 26 for supplying fuel from the fuel supply line 22 through the conduit system 20 to the heaters 14.

A lead 96 branches from the lead 86 and extends to a position adjacent each of the switch heaters 14. A branch 98 is tapped from the lead 96 adjacent each switch heater and has a control switch 100 interposed therein and responding to a thermostatic member 102 positioned adjacent each heater to respond to the temperature of the switch heater. Each switch 100 is preferably a single pole double throw switch and, in its normal position at ambient or atmospheric temperatures, will be conditioned to close a circuit with a lead 104. The ignition elements 50 are interposed in these leads 104, and the leads 104 are in turn tapped to a lead 106 common to all of the switches 100, ignition elements 50 and leads 104. The lead 106 is tapped or connected to the lead 88. Therefore, it will be apparent that upon the closing of the switch 84 by the relay 82 which serves to open the master control valve 26 by actuation of the valve control member 92, 94, there will occur simultaneously an energization of the ignition member 50 for igniting the fuel in the switch heaters 14.

The other or normally open terminal of each of the switches 100 is connected with one of the leads 108. The leads 108 extend to terminals 110 of signal circuits extending back to the control station and including some signal, such as a light or other indicator 111, positioned in the control station. The opposite terminals 112 of these signal circuits are connected by a lead 114 with the line 88. Thus it will be apparent that, after the switch heaters 14 are placed in operation so that the heat generated thereby reaches a certain setting, the thermal responsive or thermostatic parts 102 of the switches 100 will throw said switches into engagement with the terminals thereof with which the leads 108 are connected. This serves the dual function of deenergizing the igniting elements 50 and of operating the signal circuits connected with the terminals 110 and 112 for indicating at the control station the fact that the switch heaters are functioning.

This circuit thus provides very simple means for operating from a remote control station each of the switch heaters along a given length of track as it becomes necessary to do so for the purpose of changing the setting of the associated switches at times when said switches are frozen or stuck. Thus at the control station the switch controlling the circuit 80 to the relay 82, 84 may be operated when it is observed that a switch will not respond to the operating means therefor. The closing of the switch 84 by the relay conditions the switch heater control circuit for operation to simultaneously open the fuel supply valve 26 to the switch heaters and energize the ignition element 50 for each switch heater. If the operation of these parts results in the ignition of and actuation of the switch heater, the fact is signalled to the operator in the control tower as soon as the switch heater starts to function by virtue of the thermostatic switches 100, 102, and simultaneously with the establishment of this signalling circuit, there occurs the disabling of the circuit to the ignition element 50 which cuts off the current to reduce the power consumed by the switch heater circuit to the minimum necessary for its continued functioning, that is, for the purpose of holding the master control valve 26 open to insure a continuous supply of fuel. In the event the signal connected with the signal terminals 110, 112 is not operated within a reasonable period of time following the operation of the controller for the relay circuit 80, the operator is advised that the switch heater is not functioning and, when adequate time has been allowed to make certain that the switch heater will not function, he may notify the maintenance operator and immediately dispatch a repairman to the location of the inoperative heater. Thus full functioning of the switch heater may be controlled from a remote location, and also full information as to the condition of the switch heater is available at the remote location so that time may be saved in the event of trouble, and economy and effective unit control of the entire section of a line may be provided. As soon as the operation of the heater is effective to permit the freeing of the switch and its operation by the remote control switch operating mechanism, the switch heater circuit may be deenergized by opening the circuit to the relay 82, thereby opening the switch 84 to close the master fuel supply valve 26 and to permit the parts of the circuit, including the thermally responsive switch 100, 102, to resume its normal condition responsive to atmospheric temperature.

A modified embodiment of the invention is illustrated in Fig. 6. In this form of the invention the control circuit leading to the control station and provided with a control switch (not shown) at the control station includes the leads 120 and the relay 122. The relay 122 controls the two-pole switch 124 interposed in the power line including the leads 126 and 128. When the control circuit to the relay 122 is open, the switches 124 are positioned in open circuit arrangement as illustrated, and, when the control circuit is energized to energize the relay 122, the relay switches 124 are closed to establish a closed circuit condition in the power circuit 126, 128. A circuit having leads 130 branching from the power leads 126, 128 has a gas and valve operating mechanism therein, illustrated diagrammatically herein and designated by the numeral 132. Consequently, when the switch 124 is closed by the relay 122, the valve operator 132 is immediately conditioned for operation to open the master valve, such as the valve 26 shown in Fig. 1, to supply fuel from the fuel supply means, such as the element 22 of Fig. 1, to the switch heater.

A lead 134 branches from the power lead 126 and is connected to an igniter 136 operatively juxtaposed to one of the switch heaters. A lead 138 connects the igniter 136 with a second igniter 140 juxtaposed to another switch heater. It will be understood that, while two igniters are shown herein for use in conjunction with a single rail switch, more than two heaters may be employed, and igniters similar to the igniters 136 and 140 will be connected in series with the igniters 136 and 140. The igniter 140 is connected by a lead 142 with the terminal of a single pole double throw switch 144 having a thermostat control element biased to closed position at ambient or atmospheric temperature and adapted to be shifted to open circuit position when the thermostat control element is hot. A lead 146 branches from the lead 142 and extends to the terminal of a second thermostatically controlled single pole double throw switch 148, which likewise is biased to closed position at atmospheric temperature and adapted to be shifted to open circuit position when the thermostatic control element is hot. The opposite terminals of the switches 144 and 148 are connected by a lead 150, and a lead 152 is tapped to the lead 150 and is connected to the line 128. Thus, there occurs simultaneously with the operation of the valve opening member 132, energization of the igniters 136 and 140 in a circuit branching from the main power circuit of lines 126, 128 and in parallel to the circuit 130, 132. The normally open terminal of each of the switches 144 and 148 is connected by one of a pair of leads 160 with one of a pair of relays 162, and these relays are connected by leads 164 with the power line 126. The relays 162 control switches 166 interposed in a signal line 168 connected with the lead 126 of the power line and extending to the control station at which an indicator 170 is located. The return line 172 from the indicator member 170 has the two switches 166 interposed therein in series and is connected at 174 with the power line 128.

By this arrangement it will be apparent that, after the power circuit has been energized by the closing of the switches 124 by the relay 122 to cause a supply of fuel to be fed to the switch heaters and the ignition of that fuel at the individual switch heaters by the igniters 136 and 140, heat will be generated by the switch heaters and will act upon the thermostatic switches 144, 148 to open the circuit to lead 146 and close the circuit to the leads 160. This switch operation breaks the circuit to the igniters 136 and 140 without interfering with the continued operation of the valve control element 132; and establishes a circuit from power line 126 through leads 164, relays 162, leads 160, switches 144 and 148, leads 150 and 152 to the power line lead 128. The operation of the relays 162 will close the switches 166 thereof, thereby energizing the signal circuit through line 126, 168, the indicator 170, lead 172, the switches 166 in said line, and the power line 128 with which the lead 172 is connected at 174. Thus, simultaneously with the opening of the circuit to the igniters, there occurs the closing of the circuit to the indicator 170 which signals the operator that the switch heaters are operating.

It will be observed that this construction differs from the construction first mentioned in that the indicator or signal circuit has the switches 166 of the relays 162 interposed therein in series so that, in the event of operation of all of the heaters in the group subject to control, the indicator will be actuated, but, in the event any one individual heater fails to operate, then the indicator light will not operate. It will be apparent that when a switch is frozen, assuming that all switch heaters associated therewith are necessary to effect thawing of the switch for release thereof for operation, then the failure of any one switch heater to operate will disable the complete system and personal attention to the switch will be required. It will be noticed also that this system has all flexibility necessary to insure the continuance of operation of the igniter juxtaposed to a switch that may be delayed in its operation, since the response of the thermal switch juxtaposed to one of the heaters, for example, the thermal response of the switch 144, will not open the circuit leading to the igniters 136 and 140, since continuance at normal position of the thermal switch 148 will hold closed the circuit to the igniters 136 and 140.

It will be apparent that my switch control mechanism is applicable to single switch installations in which only two switch heaters are utilized, or to multiple switch installations in which more than two switch heaters are required; that in both embodiments of the invention the igniters are continued in operation only so long as their use is required, and are automatically thrown out of the circuit after the heaters are thrown into operation, and that means are provided further to insure that the operation of the switch heaters is indicated to the operator as soon as the heaters operate to generate heat.

While the preferred embodiments of the invention have been illustrated and described herein, it will be understood that the invention may be embodied in other forms within the scope of the appended claims without departing from the spirit of the invention.

I claim:

1. In combination, a pair of rail switch heaters, means for supplying fuel to said heaters, a fuel supply controller, a pair of igniters, a normally inoperative circuit in which said controller and igniters are connected in parallel, and a circuit including a control element located at a control station and an actuator for controlling said first circuit, and a signal circuit including a signal element located at said control station and a pair of normally open thermo-switches responsive to the temperature of said switch heater and connected in series with said signal element.

2. In combination, a pair of rail switch heaters, means for supplying fuel to said heaters, a fuel supply controller, a pair of igniters, a normally inoperative circuit in which said controller and igniters are connected in parallel, and a circuit including a control element located at a control station and an actuator for controlling said first circuit, a normally inoperative signal circuit including a signal element located at said control station, and means responsive to the temperature of each switch heater for deenergizing said igniters, said last named means controlling said signal circuit when simultaneously energized.

3. In combination, a rail switch heater including a plurality of burners positioned adjacent to and alongside different parts of a rail switch, means for supplying fuel to said burners, means for controlling the supply of fuel from said supply means to said burners, an igniter for each burner, an actuating circuit, said fuel control means and igniters being connected in said actuating circuit, a control circuit including a control element located at a control station, and means actuated by said control circuit for operating said actuating circuit, said igniters being connected in said circuit in parallel to said fuel control means, and thermostatic means responsive to the temperature of said burners for deenergizing said igniters independent of said fuel control means, and a normally open signal circuit including a signal element located at said control station and a pair of control elements responsive to the temperature of said burners and connected to said signal element and each other in series.

4. In combination, a rail switch heater including a plurality of gas burners positioned adjacent to and alongside different parts of a rail switch, means for supplying gas to said burners, means for controlling the supply of gas from said supply means to said burners and including an electric circuit, an igniter for each burner, a circuit for each igniter branching from said first circuit, said igniter circuits being connected in parallel, each igniter circuit including a normally closed controller responsive to the temperature of the burner correlated with the igniter connected in said circuit and adapted to open said circuit when said burner operates, and a plurality of parallel signal circuits branching from said first circuit, and a normally open controller in each signal circuit responsive to the temperature of a burner and adapted to close the associated signal circuit when said burner operates.

WILLIAM McKEAN WHITE, Jr.

References Cited in the file of this patent

UNITED STATES PATENTS

| Number | Name | Date |
|---|---|---|
| 2,119,894 | Strand | June 7, 1938 |
| 2,361,530 | Burch | Oct. 31, 1944 |
| 2,381,591 | Heymann | Aug. 7, 1945 |
| 2,388,855 | Leslie | Nov. 13, 1945 |
| 2,413,388 | Smith | Dec. 31, 1946 |